US004001721B2

United States Statutory Invention Registration [19]

[11] Reg. Number: H1721

Wainwright

[45] Published: Apr. 7, 1998

[54] AQUEOUS RECHARGEABLE BATTERY

[75] Inventor: David Stanley Wainwright, Vancouver, Canada

[73] Assignee: Moli Energy (1990) Limited, Maple Ridge, Canada

[21] Appl. No.: 772,464

[22] Filed: Dec. 23, 1996

[30] Foreign Application Priority Data

Sep. 20, 1996 [CA] Canada ..... 2186099

[51] Int. Cl.[6] ..... H01M 10/42

[52] U.S. Cl. ..... 429/49

[58] Field of Search ..... 429/206, 194, 429/224

[56] References Cited

U.S. PATENT DOCUMENTS 5,441,831 8/1995 Okamoto et al. .
5,604,057 2/1997 Nazri ..... 429/224

FOREIGN PATENT DOCUMENTS 2134052 4/1995 Canada .
2114902 8/1995 Canada .

OTHER PUBLICATIONS

Li, et al., "Lithium–Ion Cells with Aqueous Electrolytes", J. Electrochem. Soc., vol. 142, No. 6, Jun. 1995, pp. 1742–1746.

"Safer Rechargeable Lithium Ion Batteries Use Aqueous Electrolyte", Materials Technology, vol. 11, No. 1, Jan./Feb. 1996, pp. 9–12.

Plichta, et al., "Lithium Ion Aqueous Cells", Army Research Lab Report No. ARL–TR–422, Feb. 1995.

Deutscher, et al., "Investigations on an aqueous lithium secondary cell", Journal of Power Sources, 55 (1995) pp. 41–46. No month.

Review of the 13th International Seminar on Primary and Secondary Battery Technology and Applications, Mar. 4–7, 1996 Boca Raton, FL, USA (as presented by ITE Newsletter No. 2 (Mar.–Apr.) 1996).

*Primary Examiner*—Charles T. Jordan
*Assistant Examiner*—Meena Chelliah
*Attorney, Agent, or Firm*—Lerner, David, Littenberg, Krumholz & Mentlik

[57] ABSTRACT

Greater energy densities can be obtained in aqueous rechargeable batteries based on the 'rocking chair' principle by the use of certain polymer insertion compounds as an electrode material. Aqueous lithium ion batteries using poly(carbon disulfide) polymer as an anode have energy densities comparable to nickel metal hydride batteries.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AQUEOUS RECHARGEABLE BATTERY

FIELD OF THE INVENTION

The invention pertains to aqueous rechargeable batteries and particularly to aqueous rechargeable batteries which employ insertion compounds as the electrode materials.

BACKGROUND OF THE INVENTION

In recent years, there have been significant advances in the battery art such that gravimetric (energy per mass) and volumetric (energy per volume) energy densities in commercial rechargeable batteries have been substantially increased. Improvements to nickel-metal hydride (NiMH) batteries have led to reported energy densities of approximately 90 Wh/kg and over 300 Wh/l. Improvements to lithium ion batteries have resulted in reported energy densities of about 135 Wh/kg and 380 Wh/l for commercial products according to Fujifilm Celltec Co. With such advantageous characteristics, batteries using these advanced electrochemical systems are generally preferred for powering consumer electronics devices and their market share is increasing. Such electrochemical systems also appear very attractive for large battery applications such as motive power for electric vehicles.

The requirements for large batteries can differ in many ways from those for small consumer electronics batteries however. For instance, gravimetric energy density seems more important than volumetric energy density for electric vehicles while the reverse is true for consumer electronics devices. Further, safety concerns become an even bigger issue for larger batteries. Also, the cost per Wh must generally be markedly less for large batteries. While they have attractive energy density characteristics, NiMH batteries are relatively expensive compared to other conventional systems (eg. Pb acid or NiCd) and do not perform well at elevated temperature (eg. above 45° C.). Lithium ion batteries also have very attractive energy density characteristics but they are markedly more expensive than NiMH batteries. Conventional lithium ion batteries also employ flammable non-aqueous electrolytes and thermally unstable lithium salts and thus fundamentally pose a more substantial safety hazard than do aqueous batteries. Indeed at the 13th International Seminar on Primary and Secondary Battery Technology and Applications, Mar. 4–7, 1996, Boca Raton, Fla., U.S.A. (as reported in the ITE Battery Newsletter No.2 Mar.–Apr. 1996), Mr. Jun Sasahura of Toshiba suggested that safety requirements already limit present Li-ion battery capacity to about 55% of its true or intrinsic energy density.

In Canadian patent application Serial No. 2,114,902, Wainwright, filed Feb. 3, 1994, available for public inspection, Aug. 3, 1995, aqueous rechargeable battery systems are disclosed which operate much like conventional lithium ion batteries except that aqueous electrolytes are employed. That is, two different insertion compounds are employed respectively as the cathode and anode electrodes and an alkali metal (eg. lithium) or alkaline earth metal species is 'rocked' during charge and discharge of the battery (ie. species insertion takes place at one electrode with simultaneous species extraction taking place at the other electrode). The use of an aqueous electrolyte makes such rechargeable battery systems fundamentally safer than their non-aqueous counterparts. Also, the typical aqueous electrolyte and typical aqueous battery construction are markedly less expensive than their non-aqueous counterparts. (The latter results from the typical non-aqueous rechargeable battery needing much thinner electrode constructions than its aqueous counterpart to compensate for the lower ionic conductivity of non-aqueous electrolytes.)

The downside of employing an aqueous electrolyte in a system otherwise similar to a lithium ion battery is that the stability range of an aqueous electrolyte to oxidation/reduction is much less than many non-aqueous electrolytes. Consequently, the operating voltage of an aqueous battery will need to be lower and more restricted than many non-aqueous batteries. This places more constraints on possible electrode material candidates and results in a reduction in energy output per unit species inserted/ extracted from the electrodes. The embodiments disclosed in Canadian patent application Serial No. 2,114,902 include combinations that have practical projected energy densities which are competitive with Pb acid batteries (eg. about 35 Wh/kg). However, higher energy densities must be achieved for applications such as electric vehicles. Also, only limited results for the capacity loss versus cycle number are obtained for the disclosed embodiments.

Further work on the aforementioned embodiments by M. Zhang et al. (mentioned in Materials Technology, Vol. 11, No. 1, Jan./Feb. 1996, p9–12) indicate that marked improvements in the capacity loss versus cycle number can be achieved by judicious choice of electrolyte for the specific $VO_2(B)$ anode material employed. The $VO_2(B)$ anode shows a rapid loss of lithium insertion capacity in an electrolyte having pH=11.3, but not in an electrolyte having pH=9.1. This is presumed to arise from a dissolution of the electrode itself into the electrolyte. With optimum electrolyte selection, excellent cycling characteristics can be expected. However, the possible dissolution of this specific anode or even any anode material in a basic electrolyte further restricts the choices available to the battery engineer designing an optimum system.

It is therefore desirable to identify other insertion compounds for these aqueous electrochemical systems that not only have absolute potentials for insertion which are compatible with aqueous electrolytes, but which also have greater capacities for insertion of an alkali metal or alkaline earth metal species and which are also more stable in basic solutions. As in non-aqueous electrochemistries, lithium is particularly desirable for use as an inserted species. Conventional non-aqueous lithium ion battery cathodes such as $LiCoO_2$, $LiNiO_2$, and $LiMn_2O_4$ have absolute potentials in a range compatible for use as a cathode in an aqueous lithium ion battery. $LiNiO_2$ is attractive because it is characterized by a large reversible capacity for lithium insertion. $LiMn_2O_4$, on the other hand, exhibits less reversible capacity but advantageously exhibits a relatively flat or constant voltage over this reversible range (thereby resulting in a battery with almost constant voltage during operation and consequently making it easier to engineer electrolyte stability over the reversible range) and the raw materials used in its preparation are less expensive.

As reported in Army Research Lab report number ARL-TR-422, Feb. 1995, E. Plichta et al., tested various conventional lithium insertion oxides and/or sulfides as both cathode and anode electrode materials for aqueous lithium ion batteries. In this article, no working combination was prepared with practical energy densities. The spinel compound $LiMn_2O_4$ was found suitable as a cathode material in principle although it was found to decompose during overcharge before oxygen evolution occurred in the specific embodiments tested (eg. batteries with electrolyte of pH~8.5). This situation might prevent the use of a conventional oxygen-hydrogen recombination reaction for overcharge protection. Accordingly, if such recombination reactions are desired, an alternate material choice is required or the electrolyte must be modified such that oxygen evolution occurs before cathode decomposition. Modifications might involve increasing the pH of the electrolyte which lowers the potential at which oxygen evolution can occur (as discussed in J. Electrochem. Soc., Vol. 142, No. 6, June 1995, W. Li et al.).

Conventional non-aqueous lithium ion battery anodes and lithium metal alloy anodes are generally unsuitable for use as an anode in an aqueous lithium ion battery because their absolute potentials are close to that of lithium metal and hence are outside a range compatible for aqueous electrolytes (as demonstrated in Journal of Power Sources, 55 (1995), 41–46, R. L. Deutscher et al.). Some well known insertion compound oxides (eg. the aforementioned $VO_2$ (B)) or sulfides (eg. $TiS_2$) have been suggested, but to date, no materials have been identified which are compatible with basic or very basic electrolytes over a large reversible range of inserted lithium.

Lately, novel high capacity insertion compounds are being discovered at a rapid rate. Carbons, amorphous tin oxides, and polymers exhibiting reversible capacities for lithium of order of 600, 800, and 500 Ah/g have recently been discovered and are described in Canadian patent application Serial No. 2,149,853, Xue, filed May 19, 1995, Canadian patent application Serial No. 2,134,052, Idota et al., filed Oct. 21, 1994, published Apr. 23, 1995, and U.S. Pat. No. 5,441,831, Okamoto et al., granted Aug. 15, 1995, respectively. The first two of these are considered suitable for use as anode materials and the third product is considered suitable for use as a cathode material in otherwise conventional non-aqueous lithium ion batteries.

SUMMARY OF THE INVENTION

The invention represents an improvement over those embodiments disclosed in Canadian Patent application Serial No. 2,114,902, Wainwright, filed Feb. 3, 1994. The improvement involves the use of a polymer for at least one of the insertion compounds. Improved energy density characteristics can be obtained by using certain polymers as insertion compounds for the electrodes and more options can become available for the selection of electrolyte salts and pH.

Although polymers were not previously considered as alternatives, polymer electrodes exhibiting large reversible capacities for inserted alkali or alkaline earth metals can be particularly useful as electrode materials in aqueous rechargeable insertion compound batteries. Polymers generally can be less prone to dissolution or decomposition in basic aqueous electrolytes. The "Handbook of Plastics and Elastomers", C. A. Harper, Editor-in-chief, 1975,McGraw-Hill, states "Generally speaking, inorganic salt solutions, weak aqueous alkaline solutions . . . do not have an adverse effect upon plastics, resins, or elastomers."

Carbon-sulfur polymers, such as those described in the aforementioned U.S. Pat. No. 5,441,831, can exhibit relatively constant voltages over a wide insertion range for alkali metals, especially lithium. Such carbon-sulfur polymers are particularly attractive for use, not only as cathode materials in non-aqueous batteries, but as anode materials in aqueous lithium ion batteries. The anode polymer can be poly(carbon disulfide) having the formula $(CS_x)_n$, wherein x is a number from about 1.2 to 2.33 and n is a number greater than or equal to 2.

Although various cathode materials may be considered, a preferred embodiment of the invention combines a poly (carbon disulfide) anode with a lithium manganese oxide spinel cathode, denoted $Li_yMn_2O_4$, wherein lithium can, in principle, be reversibly inserted over a value of y ranging from 0 to about 2.

The aqueous electrolyte can comprise one or more lithium salts. To maintain stability of the electrolyte against oxidation/reduction, a basic electrolyte is preferred (ie. pH>7). A very basic electrolyte may be preferred for a poly(carbon disulfide) anode/ lithium manganese oxide spinel cathode embodiment. LiOH may be employed to adjust pH and other non-hydroxide salts of lithium may be used as a source of additional lithium ions in the electrolyte solution.

BRIEF DESCRIPTION OF THE DRAWINGS

The provided FIGURE illustrates certain non-optimized aspects of the invention, but should not be construed as limiting in any way.

EMBODIMENTS OF THE INVENTION

Figure 1:
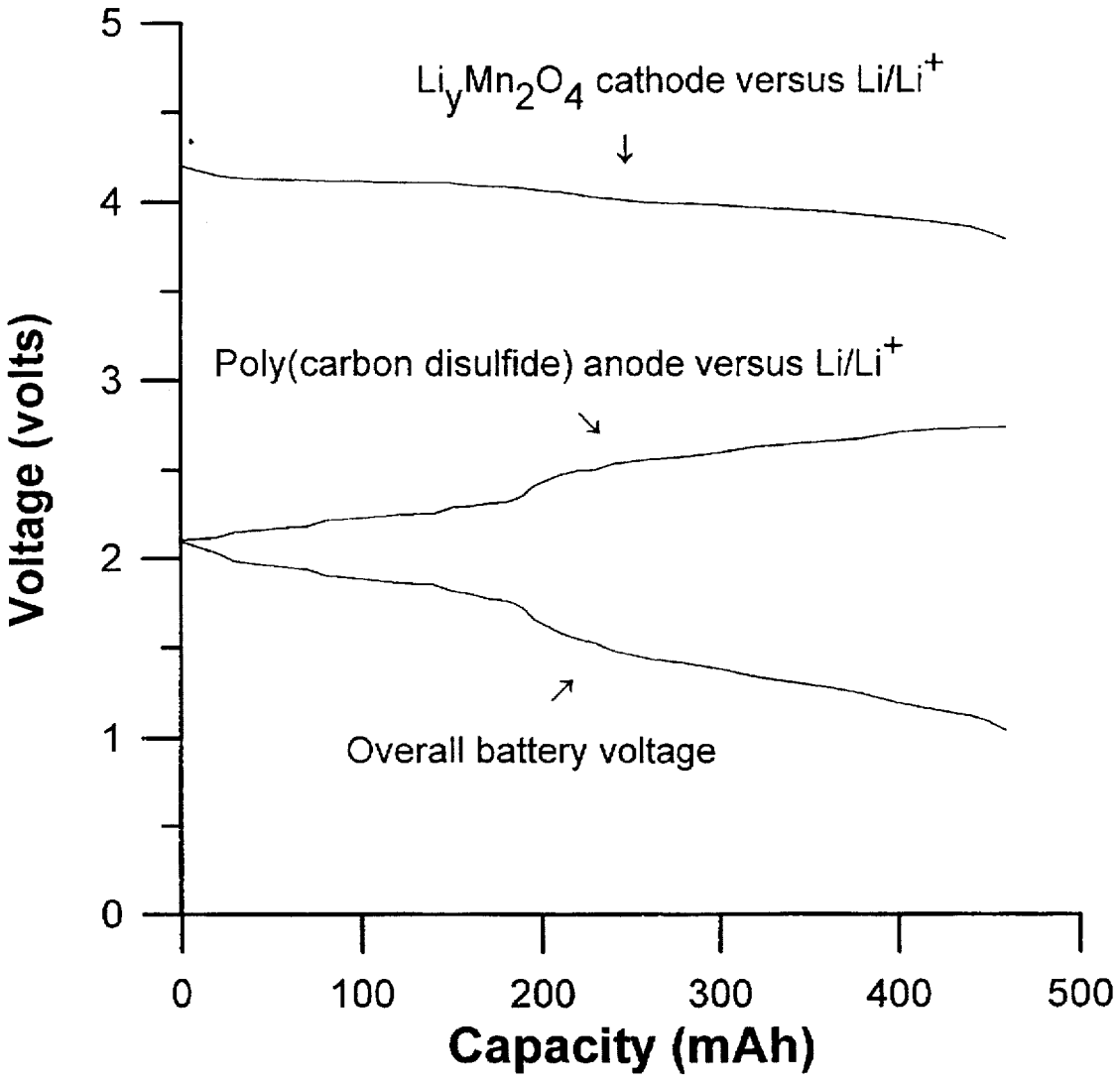
FIG. 1 shows the overall voltage of the battery of Example 1 versus capacity and also shows the voltages of the individual electrodes therein versus $Li/Li^+$.

A variety of actual constructions, sizes, configurations, etc. are possible for the battery of the invention. All share a fundamental construction which represents a mixture of conventional aqueous and non-aqueous battery constructions. The basic operation is similar to a non-aqueous lithium ion battery in that the cathode and anode electrodes comprise a first and second insertion compound respectively in electrical contact with respective cathode and anode current collectors. (Herein, insertion compounds are broadly defined as host materials into which a species can be inserted and extracted without irreversible effect on the structure of the host). In physical contact with both electrodes is an aqueous electrolyte comprising a dissolved salt of the inserted species A of the battery. During operation of the battery, ions of A migrate to and from each electrode through the aqueous electrolyte. Concurrently, electrons migrate to and from each electrode via an external circuit. (Note that some hydrogen insertion can inherently be expected to occur to some limited extent in both electrodes. Additionally therefore, some limited 'rocking' of hydrogen may also occur between the electrodes.)

As explained in the aforementioned Canadian patent application Serial No. 2,114,902, the electrode materials are preferably selected such that the largest operating voltage is obtained without decomposing the aqueous electrolyte into $H_2$ and $O_2$ by electrolysis. (Note that, as with conventional aqueous batteries, practical batteries may be constructed that operate beyond the fundamental thermodynamic stability limits of the electrolyte. It is possible in principle to operate at significant overvoltages before significant gas evolution occurs.) Of course, the electrodes themselves must also not decompose or dissolve. Polymer insertion compounds are generally more stable and less prone to dissolution in basic electrolytes than are typical inorganic insertion compounds. Thus, their use would generally provide for greater options with regards to electrolyte salts and pH selection in the aqueous electrolyte.

As explained in the aforementioned Canadian patent application Serial No. 2,114,902, the selection of electrolyte salt/s and pH can be complex as many mutually dependent factors must be considered. The use of electrode materials that are stable in the presence of most salts and over a wide pH range does however simplify this process. The electrolyte preferably has high ionic conductivity and has sufficient salt concentration to prevent electrolyte depletion during operation of the battery. This implies having a substantial cation concentration which may additionally help to bind the water to the dissociated salt ions (thereby preventing reaction with inserted lithium to some extent) and to prevent the water from decomposing into $H_2$ and $O_2$. It may be desirable to use more than one dissolved salt in the electrolyte in order to meet all these conditions simultaneously.

Preferred embodiments will combine the advantages of both aqueous and non-aqueous battery constructions where possible. As typical aqueous electrolytes have much higher ionic conductivities than typical non-aqueous electrolytes, the thicker electrode constructions of aqueous batteries may be employed resulting in a simpler, less expensive construction than those of non-aqueous batteries. However, unlike Pb acid batteries for instance, the aqueous electrolyte in the battery of the invention does not substantially participate in its basic electrochemical operation. Thus, relatively high loadings of active electrode can be expected in the battery. For instance, the active electrode materials constitute about 50% by weight in today's typical small cylindrical non-aqueous lithium ion batteries in commercial use, and these batteries employ relatively large area, yet thin electrodes. Thicker electrode constructions in larger batteries are expected to allow for an increase in achievable electrode loading since the relative contributions of separator, current collectors, and container may be reduced. Also, the relative weight of the container has recently been reduced in certain commercial non-aqueous lithium ion batteries by using aluminum instead of steel. It is therefore not unreasonable to expect that electrode loadings corresponding to 60% by weight of the total battery will be possible in aqueous battery constructions.

Further, it can be preferred to provide for overcharge protection via oxygen recombination reactions as found in many conventional aqueous systems. This involves engineering the battery such that after a full recharge, continued charging or overcharging results in controlled, limited oxygen evolution at the cathode without otherwise decomposing the cathode. Batteries are usually assembled somewhat electrolyte starved such that it is easier and hence faster for the evolved oxygen to migrate back to the anode where recombination can occur. Hydrogen evolution at the anode is preferably avoided as much as is possible. Additives or inhibitors may be used to increase the hydrogen overpotential at the anode and hence suppress generation of hydrogen gas. Batteries may also be slightly cathode limited to avoid evolving hydrogen at the anode. (Otherwise, the capacities of both electrodes would generally be balanced in order to maximize overall battery capacity.) The voltages at which both oxygen and hydrogen are evolved will of course strongly depend on the electrolyte pH selected.

In commercial Li ion batteries, it is conventional to load the total amount of the inserted species A into the first insertion compound prior to constructing the battery. Nonetheless, it may be advantageous to load a portion of the total amount of the inserted species A into either the first or second insertion compounds, or both, during assembly. In other circumstances, it may be desirable to add an excess of a salt of A in order to electrochemically insert additional species A into an electrode and hence into the battery prior to completing the battery assembly. (The electrochemical method for accomplishing this is the subject of the invention of Canadian patent application Serial No. 2,114,492, Dahn, filed Jan. 28, 1994.)

Hardware requirements (including current collectors and container) for the batteries of the invention can also be expected to share similarities to other aqueous systems. Consideration with regards to possible chemical and/or electrochemical corrosion must be made in the choice of this hardware, particularly if strongly basic electrolytes are employed. As with some Pb acid batteries, it may be desirable to adopt a design that allows for replenishment of the electrolyte over time in order to compensate for losses due to electrolysis.

A preferred embodiment of the invention is an aqueous battery wherein lithium is the inserted species. For anode materials, a class of carbon-sulfur polymer insertion compounds is preferred as their voltage characteristics can be fairly constant over a wide insertion range for lithium, and their voltages (typically about 2.5 V versus $Li/Li^+$) are at an absolute potential near that for hydrogen evolution in the electrolyte. The polymer poly(carbon disulfide) described in the aforementioned U.S. Pat. No. 5,441,831 is particularly preferred as an anode since it is characterized by a very large reversible capacity for lithium over a voltage range of from about 2.1 to 2.7 V versus $Li/Li^+$. The structure of poly (carbon disulfide) is characterized by repeating units having C-S bonds in the chain and branches having C=S bonds. The following example illustrates the possible capacity advantages that might be achieved by employing poly (carbon disulfide) as an anode material in an aqueous lithium ion battery.

EXAMPLE

The voltage and capacity characteristics for an aqueous rechargeable battery are illustrated in FIG. 1 for an electrochemical couple comprising a lithium manganese oxide spinel cathode (denoted $Li_yMn_2O_4$) and a poly(carbon disulfide) anode. The lithium manganese oxide spinel cathode is considered as cycling with a 115 mAh/g reversible capacity at voltages versus $Li/Li^+$ ranging from 3.8 to 4.2 V (see for instance, J. Electrochem. Soc., Vol. 143, No.1, p109, FIG. 9, sample A-1). The poly(carbon disulfide) anode is considered as cycling with a 460 mAh/g reversible capacity at voltages versus $Li/Li^+$ ranging from 2.8 to 2.1 V (see for instance, aforementioned U.S. Pat. No. 5,441,831). The battery is assumed to comprise 4 g of spinel cathode material and 1 g of poly(carbon disulfide) anode material and the total active electrode weight (5 g) amounts to 60% of the overall battery weight.

FIG. 1 shows the approximate individual cathode and anode voltages versus Li/Li+ (based on low rate discharge data given in the cited references) as well as the expected overall battery voltage during a discharge (given by the difference in cathode and anode voltages). Under the above conditions, the battery delivers 460 mAh at an average voltage of about 1.5 V (ranging over about 1.0–2.1 V) and therefore has a gravimetric energy density of about 83 Whr/kg, which is competitive with commercial nickel metal hydride batteries. [Note that hysteresis between charge and discharge voltage curves and/or operation at high rate implies that either the charge voltage will have to be somewhat higher than that shown in FIG. 1 or that the achieved capacity will be somewhat lower.]

The aqueous electrolyte salt and pH are selected such that hydrogen evolution does not occur. Ideally, the electrolyte also allows for full recharge followed shortly after by the onset of oxygen evolution on OC for recombination purposes. From thermodynamic principles, a fairly basic electrolyte seems preferred, and can be obtained by using LiOH as a salt. Other Li salts (eg. nitrate, chloride, etc.) may also be used to provide for more cations if desired. Note that some concentration of OH near pH=10 may be required to stabilize $Li_{1+n}Mn_2O_4$ in aqueous solution, but that excessive concentration of $OH^-$ can result in the spontaneous reaction of $Li_{1-n}Mn_2O_4$ with $Li^+$ and $OH^-$ to make $LiMn_2O_4$, oxygen, and water as described by Kanoh et al. in J. Electrochem. Soc., Vol. 140, No.11, p3162-66.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An aqueous rechargeable battery having a cathode including a first insertion compound with inserted species A, the amount of inserted A in the cathode increasing on discharge and decreasing on recharge of the battery, wherein A is a member of the group consisting essentially of the alkali metals and alkaline earth metals, an anode including a second insertion compound with inserted species A, the amount of inserted A in the anode decreasing on discharge and increasing on recharge of the battery, and an electrolyte comprising a salt of A dissolved in an aqueous solvent mixture, wherein the improvement comprises using of a polymer for at least one of the insertion compounds.

2. A rechargeable battery as claimed in claim 1 wherein the second insertion compound is a polymer.

3. A rechargeable battery as claimed in claim 2 wherein the polymer is a carbon-sulfur based polymer.

4. A rechargeable battery as claimed in claim 3 wherein the polymer is poly(carbon disulfide) having the formula $(CS_x)_n$, wherein x is a number from about 1.2 to 2.33 and n is a number greater than or equal to 2.

5. A rechargeable battery as claimed in claim 4 wherein A is lithium.

6. A rechargeable battery as claimed in claim 5 wherein the first insertion compound is a lithium manganese oxide spinel $Li_yMn_2O_4$, wherein y is a number in the range from 0 to about 2.

7. A rechargeable battery as claimed in claim 5 wherein the pH of the electrolyte is greater than 7.

* * * * *